(12) United States Patent
Matsueda et al.

(10) Patent No.: US 7,335,953 B2
(45) Date of Patent: Feb. 26, 2008

(54) CIRCUIT SUBSTRATE, ELECTRO-OPTICAL DEVICE, AND ELECTRONIC APPARATUS

(75) Inventors: Yojiro Matsueda, Chino (JP); Hayato Nakanishi, Toyama (JP)

(73) Assignee: Seiko Epson Corporation, Tokyo (JP)

( * ) Notice: Subject to any disclaimer, the term of this patent is extended or adjusted under 35 U.S.C. 154(b) by 776 days.

(21) Appl. No.: 10/676,072

(22) Filed: Oct. 2, 2003

(65) Prior Publication Data

US 2004/0100608 A1 May 27, 2004

(30) Foreign Application Priority Data

Oct. 29, 2002 (JP) ............................ 2002-314922

(51) Int. Cl.
*H01L 23/62* (2006.01)
(52) U.S. Cl. ...................... 257/355; 257/360; 257/536; 257/E27.016
(58) Field of Classification Search ................ 257/487, 257/489, 358, 360, 72; 361/90
See application file for complete search history.

(56) References Cited

U.S. PATENT DOCUMENTS

| | | | | |
|---|---|---|---|---|
| 4,819,047 A | * | 4/1989 | Gilfeather et al. | 257/357 |
| 5,034,845 A | * | 7/1991 | Murakami | 361/56 |
| 5,635,822 A | * | 6/1997 | Marchio et al. | 323/273 |
| 5,717,559 A | * | 2/1998 | Narita | 361/56 |
| 5,736,732 A | * | 4/1998 | Possin et al. | 250/208.1 |
| 5,917,220 A | * | 6/1999 | Waggoner | 257/360 |
| 5,991,134 A | * | 11/1999 | Tan et al. | 361/56 |
| 6,211,554 B1 | * | 4/2001 | Whitney | 257/355 |
| 6,696,701 B2 | * | 2/2004 | Hector et al. | 257/72 |
| 6,967,826 B2 | * | 11/2005 | Roohparvar | 361/56 |
| 7,115,952 B2 | * | 10/2006 | Woo et al. | 257/355 |
| 2007/0034875 A1 | * | 2/2007 | Yamazaki et al. | 257/59 |

FOREIGN PATENT DOCUMENTS

| | | |
|---|---|---|
| JP | A-58-116573 | 7/1983 |
| JP | A-63-85586 | 4/1988 |
| JP | A-63-106788 | 5/1988 |
| JP | A-2-61618 | 3/1990 |
| JP | A-2-242229 | 9/1990 |
| JP | 06-202149 | 7/1994 |
| JP | A-6-273783 | 9/1994 |
| JP | A-7-175086 | 7/1995 |
| JP | A-7-181516 | 7/1995 |
| JP | A-8-101397 | 4/1996 |
| JP | A-8-179360 | 7/1996 |
| JP | A-8-248430 | 9/1996 |
| JP | 10-077460 | 3/1998 |
| JP | A 2000-305476 | 11/2000 |
| KR | P2002-0088450 | 11/2002 |

* cited by examiner

*Primary Examiner*—Jerome Jackson
*Assistant Examiner*—Paul Budd
(74) *Attorney, Agent, or Firm*—Oliff & Berridge, PLC

(57) ABSTRACT

The invention provides a circuit substrate including an electrostatic-breakdown-protection circuit efficient for an EL display panel or the like. A substrate includes a common electrode formed on the perimeter of the substrate, multiple terminals formed on the substrate, one or more first resistances formed between adjacent terminals, and one or more second resistances formed between the terminals and the common electrode. The terminal is connected to both the first resistance and the second resistance. The first resistance has a resistance value greater than the second resistance.

16 Claims, 7 Drawing Sheets

$R_1 \ll R_3 < R_2 < R_4$ $R_1 \ll R_3 < R_2 < R_4$

CIRCUIT SUBSTRATE, ELECTRO-OPTICAL DEVICE, AND ELECTRONIC APPARATUS

BACKGROUND OF THE INVENTION

1. Field of Invention

The present invention relates to a circuit substrate used for an electro-optical device, such as a display panel or the like. More particularly, the invention relates to a configuration to enhance the reduction or prevention of electrostatic breakdown during manufacturing or operating of the circuit substrate.

2. Description of Related Art

With some related art circuit substrates used for electro-optical devices, such as active-matrix-driven liquid crystal display panels, EL (electro-luminescence) display panels, or the like, an electrostatic-protection configuration can be provided to reduce or prevent breakdown of the internal circuit due to static electricity occurring during manufacturing or operation.

Related art electrostatic-protection configurations, can be provided such that terminals are connected with protection patterns with the adjacent terminals short-circuited or connected with a resistance during manufacturing, and the protection patterns are cut off following completion, as disclosed in Japanese Unexamined Patent Application Publication No. 58-116573 or Japanese Unexamined Patent Application Publication No. 63-106788. The related art also includes a structure where all the disposed terminals are short-circuited along the perimeter of the substrate outward from the disposed terminals during manufacturing, as disclosed in Japanese Unexamined Patent Application Publication No. 2-242229, Japanese Unexamined Patent Application Publication No. 7-181516, and Japanese Unexamined Patent Application Publication No. 7-175086.

Other related art electrostatic protection configurations can be provided such that resistances in the range causing no problem with regard to operation of the data lines and the scan lines are added, and accordingly, a step of cutting off the protection patterns can be eliminated even following electrical testing, and electrostatic breakdown can also be reduced or prevented in the final product, as disclosed in Japanese Unexamined Patent Application Publication No. 63-085586, Japanese Unexamined Patent Application Publication No. 2-061618, Japanese Unexamined Patent Application Publication No. 6-273783, and Japanese Unexamined Patent Application Publication No. 8-179360.

SUMMARY OF THE INVENTION

However, the related art does not include any particular arrangements where a circuit substrate including a layout to supply various types of signals, such as analog signals and digital signals and various kinds of potential, has a configuration to efficiently reduce or prevent electrostatic breakdown while reducing or preventing cross-talk.

Furthermore, while the related art includes configurations having predetermined protection patterns at each terminal, the related art does not include the relation between the protection patterns.

The present invention addresses or solves the above, and provides a circuit substrate, a manufacturing method thereof, an electro-optical device, and an electronic apparatus, having electrostatic-breakdown-prevention functions suitable for a layout to supply various types of signals, such as analog signals and digital signals and various kinds of potential.

A circuit substrate according to the present invention includes multiple terminals formed on a substrate, and one or more resistances formed between the terminals adjacent one to another. The multiple terminals include analog terminals connected to analog signal lines to supply analog signals, and digital terminals connected to digital signal lines to supply digital signals. Furthermore, the resistance which has at least one end thereof connected to the analog terminal, has a resistance value greater than the resistance connected between the digital terminals.

Analog signals are influenced by cross-talk, and accordingly, there is the need to reduce the influence of the adjacent lines as compared with digital signals, while maintaining prevention of electrostatic breakdown. With the present invention, the resistance connected to an analog terminal is greater than the resistance connected to a digital terminal, thereby providing the advantage of reducing or suppressing cross-talk to a reduced amount of minimum in the analog terminals, while maintaining protection of all the terminals from static electricity with the resistances.

Note that "connecting to an analog terminal" means that at least one end of a resistance is connected to an analog terminal, and "connecting between digital terminals" means that both ends of a resistance are connected between digital terminals.

Furthermore, with the present invention, "circuit substrate" means a substrate where wiring has been made to supply various kinds of signals and potential, and the circuit configuration thereof is not restricted to a particular one. For example, the circuit substrate may be a display panel substrate having a display function, or may be a substrate used for a computer.

Furthermore, with the present invention, "resistance" means not only a resistance-film configuration, having a predetermined resistance value, formed of a semiconductor film such as polysilicon or the like, but also a protection circuit employing the forward voltage characteristic and reverse voltage drop due to the PN junction of a semiconductor, which is employed along with or instead of the resistance-film configuration. For example, the resistance may include a protection circuit configuration employing PN junction configurations in the reverse directions (e.g., a configuration where diodes in the forward direction and the reverse direction are connected in parallel).

Furthermore, a circuit substrate according to the present invention includes a common electrode line formed on the perimeter of a substrate, multiple terminals formed on the substrate, and one or more resistances formed between the terminals and the common electrode line, where the multiple terminals include analog terminals connected to analog signal lines to supply analog signals, and digital terminals connected to digital signal lines to supply digital signals. Furthermore, the resistance connected to the analog terminal has a resistance value greater than the resistance connected to the digital terminal.

Furthermore, a circuit substrate according to the present invention includes a common electrode line formed on the perimeter of a substrate, multiple terminals formed on the substrate, one or more first resistances formed between the terminals adjacent one to another, and one or more second resistances formed between the terminals and the common electrode line.

That is to say, with a configuration where the first resistance and the second resistance are connected in parallel, even in the event that the first resistance between an analog terminal and the adjacent terminal has a somewhat great resistance value, the total resistance value is greatly reduced due to the parallel connection, thereby efficiently providing reduction or prevention of electrostatic breakdown.

In this case, with a configuration wherein a terminal is connected to both the first resistance and the second resistance, the first resistance preferably has a resistance value greater than the second resistance. The second resistance connected to the common electrode line has a low resistance value, and accordingly greater electrostatic current flows in the second resistance, thereby efficiently reducing or preventing the internal circuit from electrostatic discharge.

In this case, the multiple terminals include analog terminals connected to analog signal lines to supply analog signals, and digital terminal connected to digital signal lines to supply digital signals. Furthermore, both the first resistance and the second resistance which have at least one end thereof connected to the analog terminal, have resistance values greater than both the first resistance which is connected between the digital terminals, and the second resistance which is connected between the digital terminal and the common electrode line. The analog terminal to transmit analog signals, where cross-talk tends to occur, is connected to a resistance greater than with the digital terminal, thereby reducing or suppressing cross-talk to a reduced amount or minimum, while maintaining reduction or prevention of electrostatic breakdown.

A modification of the above-described circuit substrate according to the present invention further includes electric power terminals connected to a power source, and resistances formed between the electric power terminals and adjacent non-electric power terminals formed for purposes other than supplying power. The electric power terminals are formed with low impedance, and accordingly with the modification, the non-electric power terminals are connected to the electric power terminals with resistances, thereby efficiently reducing or preventing electrostatic breakdown.

In this case, the resistance has a resistance value equal to or less than the resistance connected to other non-electric power terminals. With the modification, the electric power terminal is connected to a resistance having relatively low resistance value in the same way as with the common electrode line, and accordingly, greater electric current flows to the electric power terminal through the resistance.

A circuit substrate according to the present invention includes a common electrode line formed on the perimeter of a substrate, data terminals connected to data lines to supply analog signals, control signal terminals connected to control signal lines to supply digital signals, electric power terminals to supply negative electric power or positive electric power, first resistances connected between the terminals adjacent one to another, and second resistances connected between the terminals.

In this case, in the event that any of the terminals are connected to both the first resistance and the second resistance, the first resistance preferably has a resistance value greater than the second resistance. The second resistance connected to the common electrode line has a low resistance, and accordingly greater electrostatic current flows to the second resistance, thereby efficiently protecting the internal circuit from electrostatic discharge.

In this case, both the first resistance and the second resistance which have at least one end thereof connected to the data terminal, preferably have resistance values greater than any of the first resistance connected between the control signal terminals, the first resistance connected between the control signal terminal and the electric power terminal, the second resistance connected between the control signal terminal and the common electrode line, and the second resistance connected between the electric power terminal and the common electrode line. The data terminals transmit analog signals where cross-talk tends to easily occur, and accordingly with the circuit substrate, the resistance connected to the data terminal preferably has a great resistance value in order to reduce or suppress cross-talk to a reduced amount or minimum, while maintaining reduction or prevention of electrostatic breakdown.

An electro-optical device according to the present invention includes a circuit substrate having a configuration according to the present invention, and furthermore, an electronic apparatus according to the present invention includes the aforementioned electro-optical device.

Here, "electro-optical device" means a device to convert the change in electric signals into the change in light using electro-optical effects, and while not restricted to any particular one, typical examples include a liquid crystal display panel having a configuration so as to drive a liquid crystal layer with the active-matrix driving method, an EL display panel having a configuration so as to drive EL devices, and the like.

Furthermore, "electronic apparatus" means an apparatus which includes an electro-optical device as a component so as to have predetermined functions, and while not restricted to any particular one, typical examples include cellular phones, video cameras, personal computers, head mount displays, rear or front projectors, facsimile apparatuses with display functions, digital camera viewfinders, portable TV sets, DSP devices, PDAs, palmtops, and the like, for example.

Furthermore, a manufacturing method according to the present invention, for a circuit substrate including a common electrode line on the perimeter thereof and multiple terminals on the inner side of the substrate from the common electrode line, includes: forming one or more first resistance configurations on regions between the terminals adjacent one to another, forming one or more second resistance configurations on regions between the terminals and the common electrode line, forming the terminals which are electrically connected to a part of the first resistance configurations and/or the second resistance configurations, and forming the common electrode line which is electrically connected to a part of the second resistance configurations.

There is no need to separate the forming of the first resistance configuration and the forming of the second resistance configuration. Both the resistance configurations may be formed in a single step using a single resistance film. In the same way, there is no need to separate the forming of the terminals and the forming of the common electrode line. Both the terminals and the common electrode line may be formed in a single step using a single metal layer.

In this case, the first resistance configurations and the second resistance configurations are preferably formed so that the first resistance configuration has a resistance value greater than the second resistance configuration. The second resistance connected to the common electrode line has a low resistance value, and accordingly greater electrostatic current flows to the second resistance, thereby efficiently protecting the internal circuit from electrostatic discharge.

BRIEF DESCRIPTION OF THE DRAWINGS

FIG. 3A is a fragmentary enlarged plan view thereof, and FIGS. 3B through 3E are cross-sectional views taken along planes B-B, C-C, D-D, and E-E, respectively, in FIG. 3A;

FIG. 8A illustrates a cellular phone, FIG. 8B illustrates a video camera, FIG. 8C illustrates a portable personal computer, FIG. 8D illustrates a head mount display, FIG. 8E illustrates a rear projector, and FIG. 8F illustrates a front projector.

DETAILED DESCRIPTION OF PREFERRED EMBODIMENTS

A description is provided below regarding exemplary embodiments according to the present invention with reference to the drawings.

[First Exemplary Embodiment]

With a first exemplary embodiment of the present invention, the present invention is applied to a circuit substrate to form an EL display panel including EL devices as electro-optical devices. In particular, the present exemplary embodiment relates to a circuit substrate with a control signal line to transmit digital signals for a scan circuit and a data line to transmit analog signals adjacent one to another.

Figure 1:
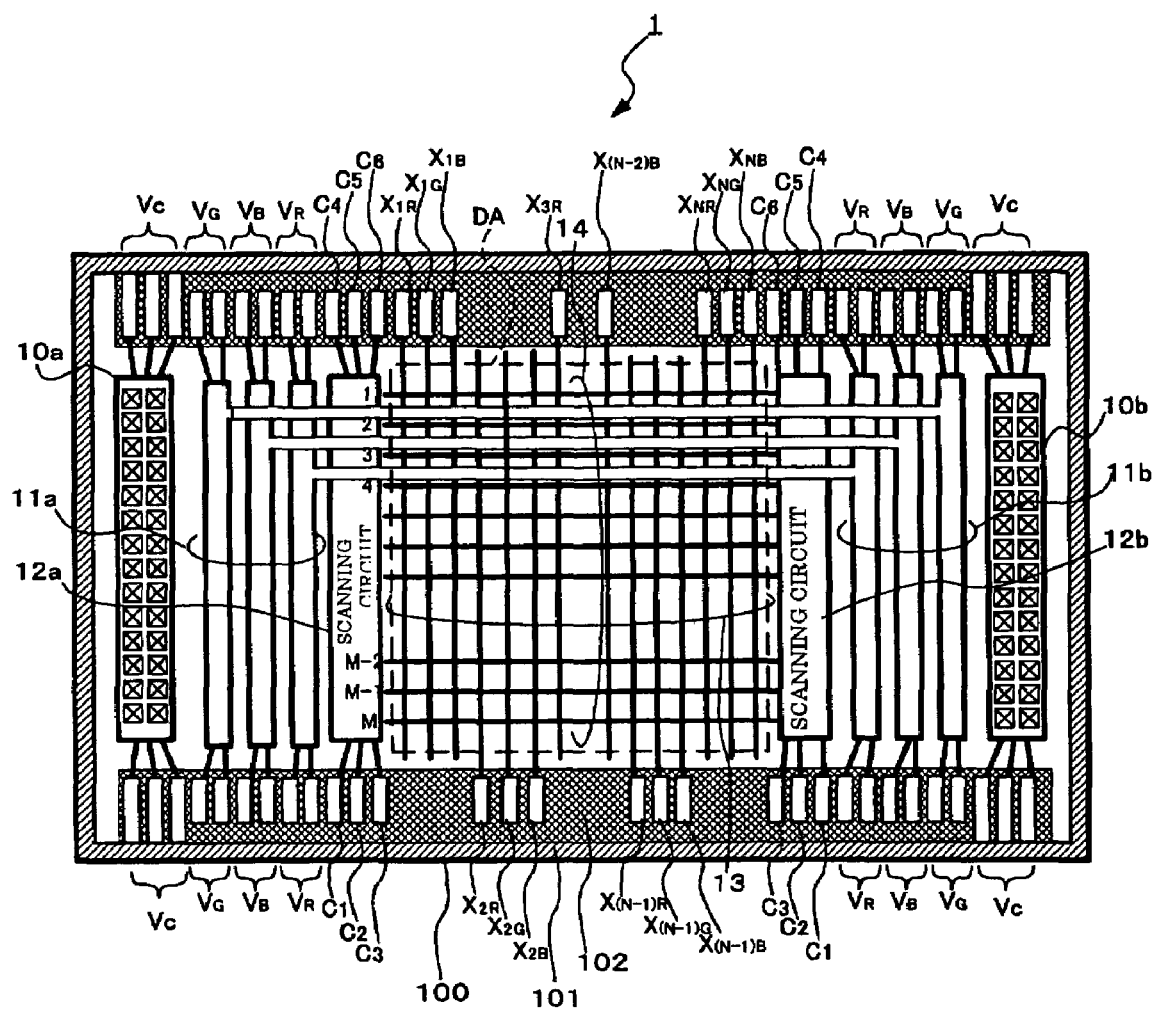
FIG. 1 is a plan view which illustrates a circuit layout of a circuit substrate according to a first exemplary embodiment of the present invention.

FIG. 1 is a plan view of an EL display panel 1 according to the present first exemplary embodiment. As shown in FIG. 1, the circuit substrate 1 includes cathode lines 10a and 10b, anode lines 11a and 11b, scan circuits 12a and 12b, a data line group 13, and a scan line group 14, disposed on a substrate 100. With the present exemplary embodiment, a large display panel is employed, and accordingly, each pair of the identical circuits are disposed with the image display area DA introduced therebetween, and electric power, signals, and the like, are supplied from both sides thereof.

The cathode lines 10a and 10b serve as contact regions to the cathode which is a common electrode. A cathode electrode film (not shown) is formed so as to be connected to the aforementioned cathode lines and so as to cover the entire substrate, thereby enabling electrostatic current to be supplied to a luminescence layer (not shown) of the EL devices formed between both electrodes formed at each unshown pixel. The anode lines 11a and 11b are formed to provide power lines between the scan lines to supply electric power to each pixel with low impedance. The scan circuits 12a and 12b have a configuration to scan a desired scan line 14 according to control signals.

Multiple terminals are formed on the substrate 100 along the longitudinal sides, wherein each line is connected to each terminal. Cathode terminals Vc are connected in parallel to multiple terminals in order to reduce the impedance thereof. Anode terminals VG, VB, and VR, are formed so as to supply independent electric power for each of the three primary colors, and multiple terminals are disposed for each of the three primary colors in order to reduce the impedance thereof. The control signal terminals C1 through C6 are formed to supply control signals for the scan circuit 12a and 12b. The data supplied from the terminals includes digital signals for control and electric power for the scan circuits. The data line terminals XnR, XnG, and XnB, ($1 \leq n \leq N$) serve as terminals to connect each of data lines 13. With the configuration shown in FIG. 1, data line terminals are disposed so that pixels adjacent in the longitudinal direction are connected to the terminal units made up of three terminals for red, green, and blue, on alternating longitudinal sides thereof in order to reduce non-uniformity in display due to voltage drop in the data lines. While pixel circuits disposed within the image display area DA are not shown to simplify description, each pixel circuit is disposed so as to be connected to one of the data lines and one of the scan lines of the active matrix formed of the data line group 13 and the scan line group 14. With the above-described configuration, data is written to each pixel circuit through the data line so that the EL device within the pixel circuit emits light with output corresponding to the aforementioned written data by selection of the scan line and control from an emission control line (not shown).

On the other hand, a common electrode 101 is formed on the substrate 100 at the perimeter thereof so as to surround the substrate 100. Furthermore, a resistance region 102 according to the present invention is formed so as to contain each terminal and so as to be connected to the common electrode 101. The adjacent terminals are electrically connected one to another with a resistance (first resistance) between the adjacent terminals formed on the resistance region 102, and each terminal is electrically connected to the grounded potential with a resistance (second resistance) between the terminal and the common electrode, thereby enabling electrostatic breakdown to be reduced or prevented.

A description is provided below regarding the relation of connection between the terminals, the common electrode, and the resistances, on the resistance region 102, with reference to FIG. 2. In order to further simplify description, the great number of identical terminals are not shown in FIG. 2.

Figure 2:
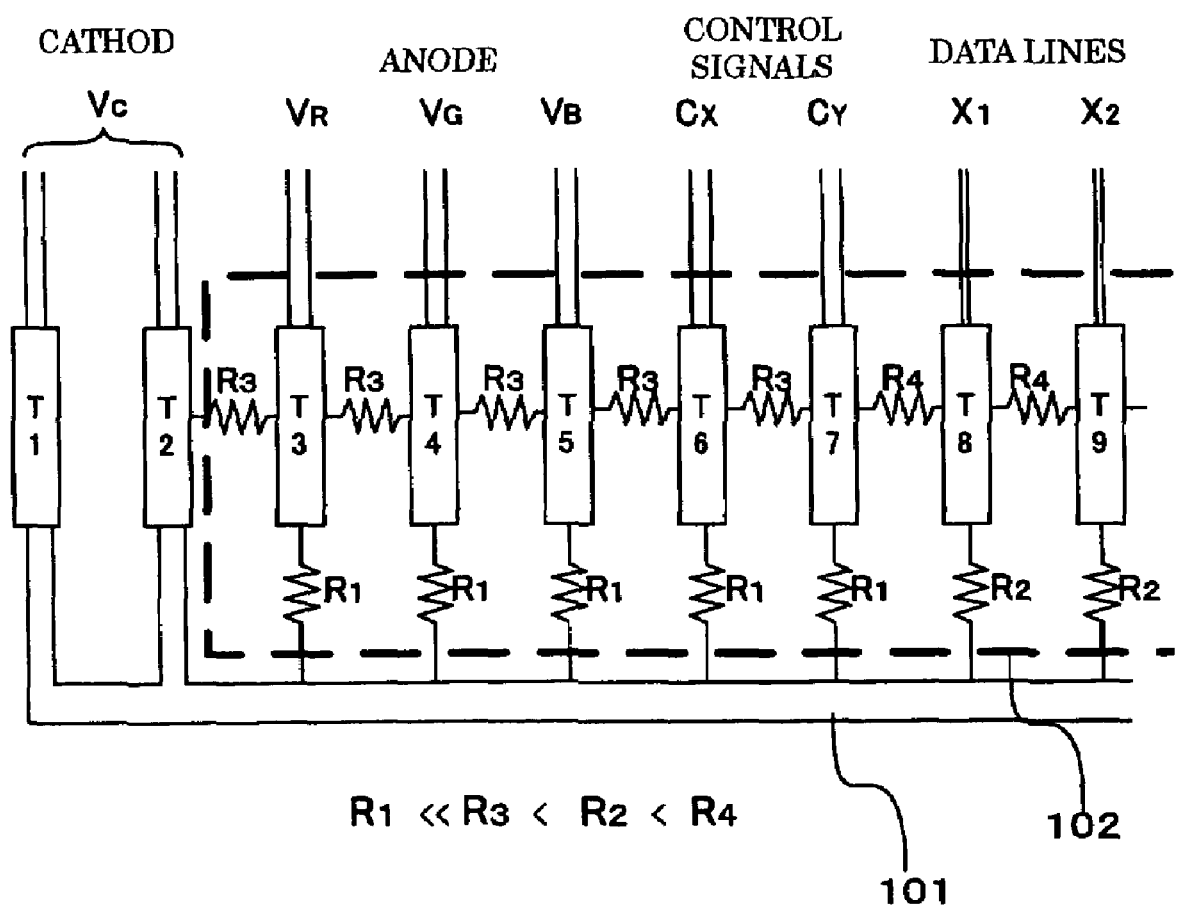
FIG. 2 is a schematic diagram which illustrates a circuit layout on a resistance region according to the first exemplary embodiment.

As shown in FIG. 2, with the present first exemplary embodiment, the cathode terminals VC, the anode terminals VR, VG, and VB, the control signal terminals CX and CY, and the data line terminals X1 and X2, are disposed in that order from the outer perimeter to the inner side of the substrate. Of these terminals, the data line terminals serve as analog terminals to transmit analog signals, and the control signal terminals serves as digital terminals to transmit digital signals. The cathode terminals are electrically connected to the common electrode, and the anode terminals serve as electric power terminals. In a case that the electric power of the anode is actively changed, an arrangement may be made where the anode terminals serve as digital terminals for a countermeasure against electrostatic breakdown.

Resistances R1 are formed between: each of the cathode terminals VC, the anode terminals VR, VG, and VB, and the control signal terminals CX and CY; and the common electrode 101. Furthermore, resistances R3 are formed between adjacent terminals of the cathode terminals VC, the anode terminals VR, VG, and VB, and the control signal terminals CX and CY. Furthermore, resistances R4 are formed between the adjacent terminals of the data line terminals X1, X2, . . . , and between the data terminal X1 and the control signal terminal CY. Furthermore, resistances R2 are formed between: each of the data line terminals X1 and X2; and the common electrode 101.

With the present invention, the resistance where at least one end is connected to an analog terminal has a resistance value greater than the resistance connected to adjacent digital terminals. That is to say, of the resistances connected between adjacent terminals, the resistance R4 connected to the data line terminal X1 or the like is set to have a resistance value greater than the resistance R3 connected to the control signal terminals CX and CY (R3<R4). Analog signals are influenced by cross-talk, and accordingly the influence of the adjacent lines should be reduced as compared with digital signals, even while maintaining reduction or prevention of electrostatic breakdown. With the present invention, the resistance connected to the analog terminal is greater than the resistance between the digital terminals, and accordingly cross-talk can be reduced to a reduced amount or a minimum in analog terminals, while maintaining reduction or prevention of electrostatic breakdown in all the terminals.

Furthermore, with the present invention, the resistance connected to the analog terminal is greater than the resistance connected to the digital terminal. That is to say, of the resistances connected between each terminal and the common electrode, the resistance R2 connected to the data line terminal X1 or the like is set to have a resistance value greater than the resistance R1 connected to the control signal terminals CX and CY (R1<R2). The reason is the same as above.

Furthermore, with the present invention, the resistance value of the first resistance formed between the adjacent terminals is greater than that of the second resistance formed between any of the aforementioned terminals and the common electrode. That is to say, with regard to the resistances R4 and R2 connected to the data line terminal, R4 serving as the first resistance is set to have a resistance value greater than R2 serving as the second resistance, and with regard to the resistances R3 and R1 connected to the signal control terminal, R3 serving as the first resistance is set to have a resistance value greater than R1 serving as the second resistance. With the above-described configuration, the second resistances R2 and R1 connected to the common electrode 101 are set to have small resistance values, and accordingly, electrostatic current is greater as compared with the first resistances R4 and R3, thereby efficiently reducing or preventing the internal circuit from electrostatic breakdown.

Furthermore, with the present invention, both of the first and second resistances where at least one end thereof is connected to the analog terminal have resistance values greater than both of the first resistance connected between the adjacent digital terminals and the second resistance connected between the aforementioned digital terminal and the common electrode.

That is to say, both of the resistances R2 and R4 connected to the data line terminals X1 or X2 are set have to resistance values greater than both of resistances R3 and R1 which are not connected to any data line terminal and are connected to the control signal terminals CX or CY. The analog terminals, wherein cross-talk tends to easily occur, have greater resistance values, and thus cross-talk can be reduced or suppressed to a reduced amount or a minimum, while maintaining reduction or prevention of electrostatic breakdown.

Furthermore, with the present invention, a resistance is formed between an electric power terminal and the adjacent non-electric-power terminal. That is to say, the anode terminal VB is adjacent to the control signal terminal CX, where the resistance R3 is formed therebetween. In general, the power electric terminals have low impedance, and accordingly, with the configuration of the present invention, electric power terminals are connected to the non-electric-power terminals with resistances, thereby efficiently reducing or preventing electrostatic breakdown.

The resistance connected to the electric power terminal has a resistance value equal to or less than the resistance connected to other non-electric-power terminals. That is to say, the resistance connected to any of the anode electrodes VR, VG, and VB, are set to have a resistance value equal to or less than the resistance connected to any of the control signal terminals CX and CY. In general, power electric terminals have low impedance, and accordingly, with the configuration of the present invention, electric power terminals are connected to the non-electric-power terminals with relatively low resistances, so even greater electrostatic current can be transmitted to the electric power terminals through resistances connected to the electric power terminals.

Summarizing the above-described relationship, the relation R1<<R3<R2<R4 holds with regard to the resistance values on the resistance region 102. Electrostatic breakdown can be reduced or prevented, even in the event that the above-described relationship is not satisfied.

Figures 3A, 3B, 3C:
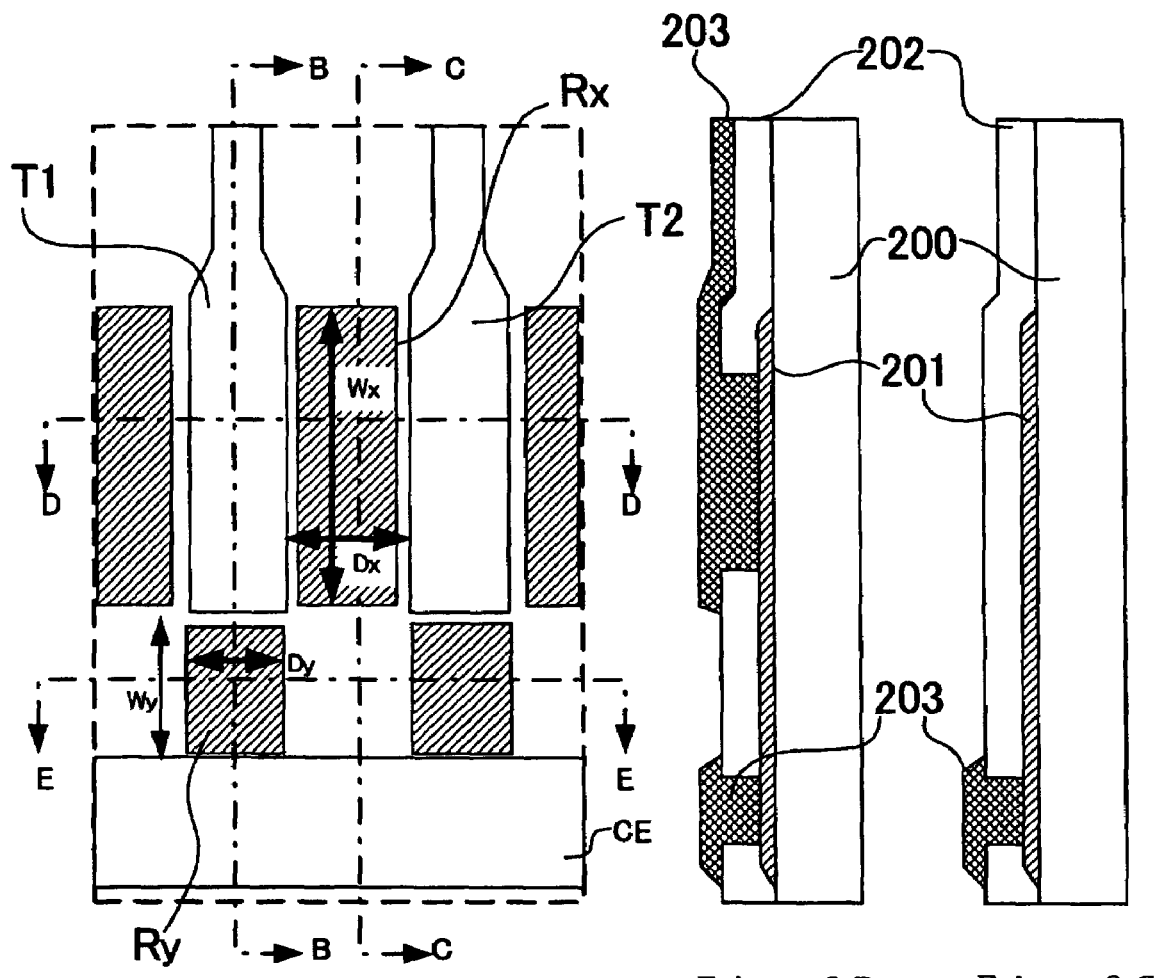
FIGS. 3A through 3E are schematics that illustrate an example of a resistance configuration according to the first exemplary embodiment, where
Figure 3D:
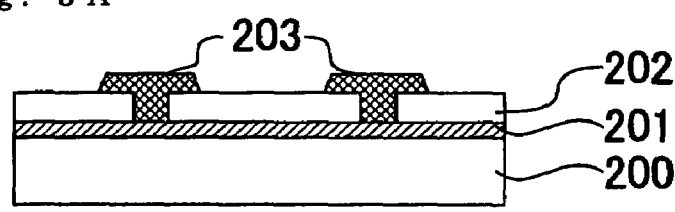
Figure 3E:
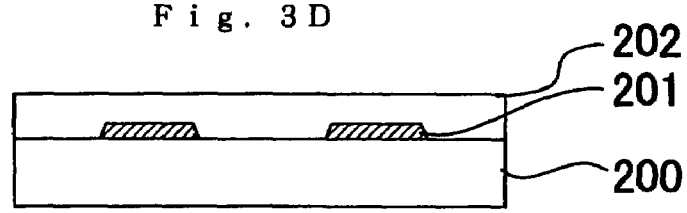

A description is provided below regarding a layer configuration of the resistance region 102 with reference to an enlarged plan view shown in FIG. 3A and cross-sectional diagram shown in FIGS. 3B through 3E. These drawings are enlarged diagrams for a region containing two terminals (T1 and T2) and the common electrode 101. Each resistance has a similar resistance configuration even while the resistances have different resistance values, and accordingly the configurations of these terminals can be understood in the same way.

A resistance configuration between adjacent terminals (first resistance configuration) Rx serves as a resistance between the terminals T1 and T2, and is determined by the width Wx and the distance DX between adjacent terminals in the plan view. A resistance configuration Ry between a terminal and the common electrode (second resistance configuration) serves as a resistance between: any of the terminals T1 and T2; and the common electrode CE, and is determined by the width Wy and the distance Dy between adjacent terminals in the plan view. These resistance configurations Rx and Ry are formed of a semiconductor film. Taking the thickness of the semiconductor film to be constant, the resistance value of each resistance configuration is determined corresponding to the width W and the distance D. That is to say, with the resistivity of the semiconductor film as $\rho$, and with the thickness of the semiconductor film as t, the relation $R=\rho \cdot D/(W \cdot t)$ holds. Accordingly, each desired resistance value according to the above-described relation can be provided by adjusting the width and distance of the patterned semiconductor film. The resistance value may be controlled by adjusting the thickness of the semiconductor film or adjusting concentration of impurities. In the event of increasing the thickness of the semiconductor film, the cross-sectional area of the semiconductor film is increased, and accordingly, the resistance value is reduced corresponding thereto, and conversely in the event of reducing the thickness, the cross-sectional area is reduced, and accordingly the resistance value is increased. On the other hand, the greater the concentration of impurities is, the smaller the resistance value is, and conversely, the smaller the concentration of the impurities is, the greater the resistance is.

A description is provided below regarding layer configurations of the resistance configurations. As shown in FIGS. 3B through 3E, these resistance configurations are formed by patterning a semiconductor film 201 formed on a substrate 200 in the corresponding form. An insulating film 202 is formed on the semiconductor film 201, and a metal layer 203 is further formed thereon so as to be patterned in the forms of terminals, lines, and common electrodes. As described above, each resistance value can be controlled by adjusting the patterned form of the semiconductor film 201.

A description is provided below in brief regarding a manufacturing method for the above-described resistance configurations.

First of all, the semiconductor film 201 is formed on the glass substrate 200 formed of silica glass, non-acrylic glass, or the like. While the semiconductor film is preferably formed of polysilicon due to the suitable resistance of polysilicon of several kΩ/square, an arrangement may be made where the semiconductor layer is formed of a high-resistivity materials such as amorphous silicon, ITO, or the like. The semiconductor film is formed with the formation method where amorphous silicon is deposited with the low-temperature plasma CVD method, and subsequently, the deposited amorphous silicon film is crystallized by a laser such as an excimer laser or the like, for example. An arrangement may be made wherein the semiconductor film is formed with other related art or known methods, e.g., a spin coating method, a droplet-discharge method, a low pressure chemical vapor deposition method (LPCVD method), or a CVD method, for example. The thickness of the semiconductor film 201 is determined based upon the required resistance value and the form of the semiconductor film.

Following formation of the semiconductor film, patterning is performed with a known photolithography method or the like so as to form required resistance configurations. In the event of directly forming patterns with the droplet-discharge method, patterning processing on the substrate can be eliminated.

Next, the insulating film 202 is formed. The insulating film 202 can be formed of silicon oxide, silicon nitride, or TEOS (tetra-ethoxy-silane), for example. While the insulating film 202 is preferably formed with the plasma CVD method, the insulating film may be formed with other related art or known methods, e.g., a coating method, such as the spin coating method, or a droplet-discharge method, such as the ink-jet method, where polysilazane dissolved in solvent is coated and heated, the low-pressure chemical vapor deposition method (LPCVD method), or the chemical vapor deposition method, where a silicon oxide film or silicon nitride film is formed.

Last of all, the metal layer 203 is formed with the sputter method, the CVD method, the droplet-discharge method, or the coating method, and is patterned in the forms of the terminals and the common electrode.

While the resistance configurations Rx and Ry are formed of the same semiconductor film in the above-described process, the resistance configurations Rx and Ry may be formed of different semiconductor films. In this case, formation and patterning of each semiconductor film is performed separately for each resistance configuration.

In the same way, the metal films for the terminals and for the common electrodes may be separately formed for the metal layer.

Figure 4:
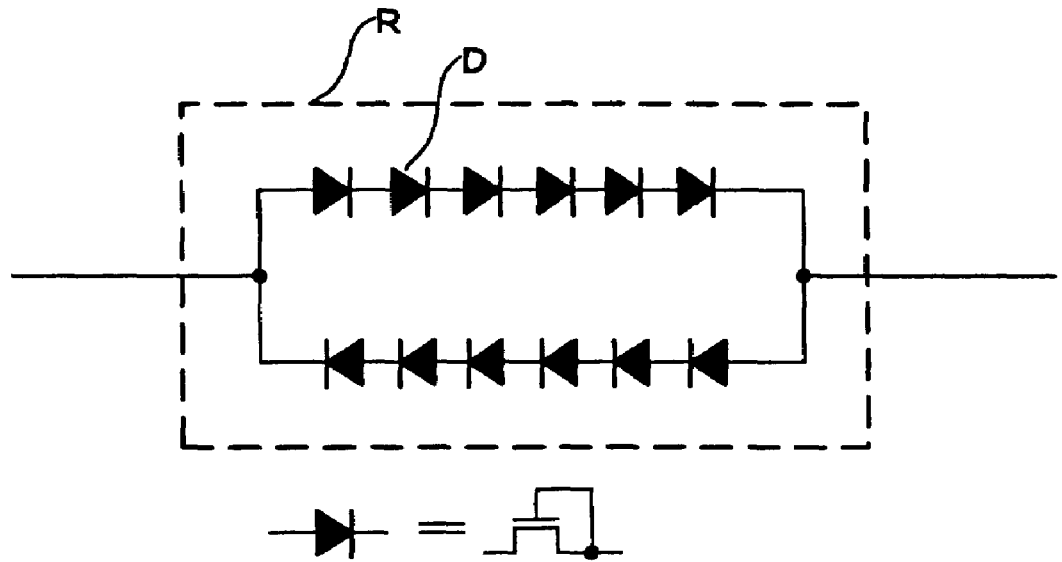
FIG. 4 is a schematic that shows an example of a protection circuit formed of diode arrays, which is a modification of the resistance according to the present invention.

Protection circuit configuration as shown in FIG. 4 may be employed as the resistance configuration instead of a resistance layer, such as a semiconductor layer, or may be connected to the resistance layer in parallel. FIG. 4 shows an arrangement having a protection circuit configuration employing forward-voltage characteristic and reverse-breakdown-voltage characteristic due to the PN junction of the semiconductor, and a diode-ring configuration wherein two pairs of diode arrays are connected in parallel, in reverse directions. Each diode can be formed by performing patterning so as to short-circuit the gate and the drain of a MOS transistor, for example, using the MOS process. With the present protection-circuit configuration, in the event that the difference between the voltages applied to both the adjacent terminals exceeds the withstanding voltage of the diode array, electrostatic current flows from the terminal having higher potential to the terminal having lower potential, thereby releasing static electricity to the adjacent line. The number of the serially-arrayed diodes is determined according to the voltage (e.g., in the range between 10 V and 100 V) which is set to trigger electrostatic protection.

As described above, according to the present first exemplary embodiment, with the analog terminals for analog signals and the digital terminals for digital signals, the resistance value of the resistances connected to the analog terminals are relatively increased, and thus the present first exemplary embodiment has the advantage of reducing or suppressing cross-talk in the analog terminals to a minimum, while maintaining reduced amount or a reduction or reduction or prevention of electrostatic breakdown for all the terminals by providing of the resistances.

Furthermore, with the present first exemplary embodiment, the resistance value of the resistance between the common electrode and the terminal is relatively reduced as compared with the resistance between the adjacent terminals, and accordingly, electrostatic current to the common electrode is greater than the electrostatic current in the resistance between the adjacent terminals, thereby efficiently protecting the internal circuit of the display panel from electrostatic discharge.

Furthermore, with the present first exemplary embodiment, a resistance is provided between an electric power terminal and the adjacent non-electric power terminal, thereby efficiently reducing or preventing electrostatic breakdown.

Thus, with the circuit substrate of the present first exemplary embodiment, the internal circuit of the display panel formed on the glass substrate which tends to be easily charged in the manufacturing step can be protected from electrostatic breakdown. Furthermore, even at the time of use in the final product, the internal circuit within the display panel can be protected against electrostatic discharge which tends to easily occur at each terminal.

[Second Exemplary Embodiment]

A second exemplary embodiment according the present invention relates to an EL display panel having the same configuration as with the first exemplary embodiment, wherein the layout of the analog terminals and the other terminals is different from the layout in the first exemplary embodiment.

With the present second exemplary embodiment, the scan circuits 12a and 12b are disposed between the cathode line 10a and the anode line 11a, and between the cathode line 10b and the anode line 11b, respectively, in a plan view shown in FIG. 1. Other components are disposed in the same way as with the first exemplary embodiment, and have the same functions as with the first exemplary embodiment, so a description thereof is omitted.

Figure 5:
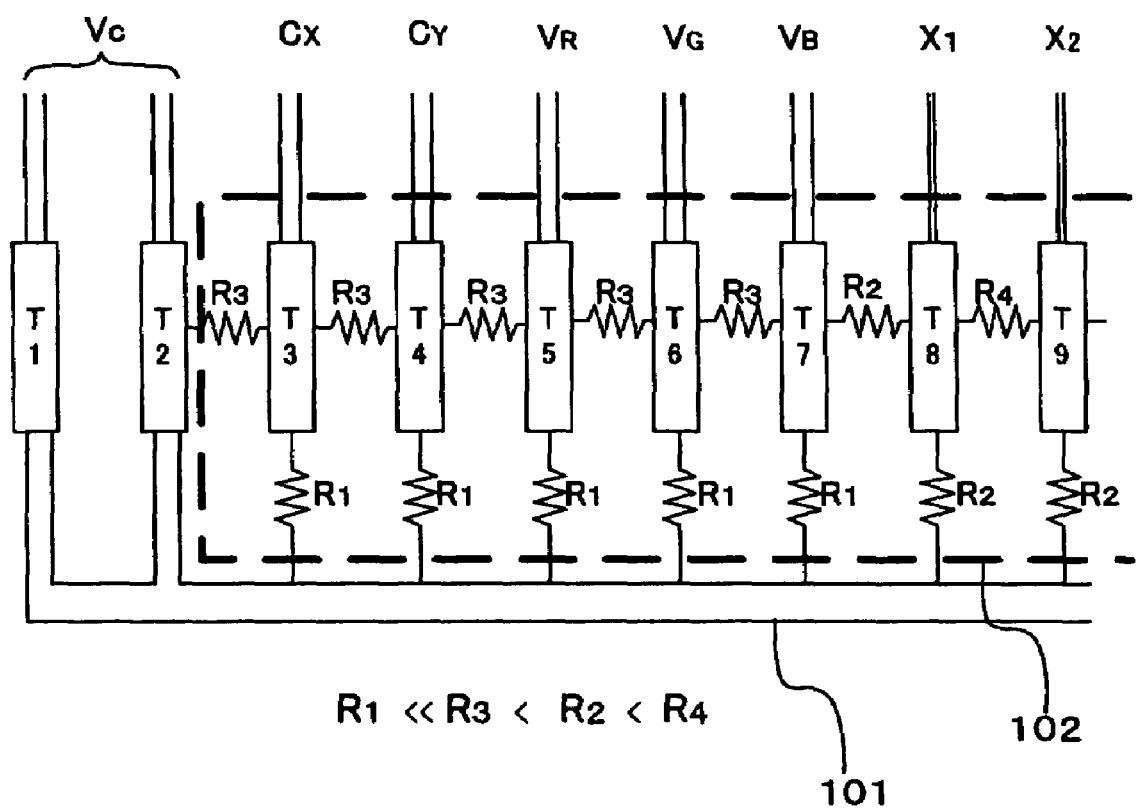
FIG. 5 is a schematic which illustrates a circuit layout on a resistance region according to a second exemplary embodiment.

FIG. 5 is a schematic which illustrates a layout of terminals according to the present second exemplary embodiment. In particular, with the present second exemplary embodiment, the control signal terminals CX ands CY are disposed between the cathode terminal VC and the anode terminal VR. In order to further simplify description, the great number of identical terminals are not shown in FIG. 5.

As shown in FIG. 5, with the present second exemplary embodiment, the cathode terminals VC, the control signal terminals CX and CY, the anode terminals VR, VG, and VB, and the data line terminals X1 and X2, are disposed in that order from the outer perimeter to the inner side of the substrate. Of these terminals, the data line terminals serve as analog terminals to transmit analog signals, and the control signal terminals serve as digital terminals to transmit digital signals. The cathode terminals are electrically connected to the common electrode, and the anode terminals serve as electric power terminals. In a case that the electric power of the anode are actively changed, an arrangement may be made wherein the anode terminals serve as digital terminals for a countermeasure against electrostatic breakdown.

While the layout of the resistances is generally the same as with the first exemplary embodiment (FIG. 2), the difference therewith is that the resistance R2 is disposed between the anode terminal VB and the adjacent data line terminal X1. That is to say, with the present second exemplary embodiment, the non-analog terminal adjacent to the digital line terminal X1 which is an analog terminal is the anode terminal VB with low impedance, and accordingly no digital signals are transmitted in the adjacent non-analog terminal, and accordingly cross-talk hardly occurs. In this case, there is no problem of cross-talk, so there is no operational problem due to reduction of the input resistance, and accordingly there is the advantage in providing a resistance with a small resistance value for reduction or prevention of electrostatic breakdown. Accordingly, with the present second exemplary embodiment, the resistance between the anode terminal and the data line terminal is set to R2.

Other resistance values for the other terminals are set in the same way as with the first exemplary embodiment, and accordingly a description thereof is omitted. That is to say, the relation of the resistances on the resistance region 102, $$R1 \ll R3 < R2 < R4$$

holds, in the same way as with the first exemplary embodiment. Electrostatic breakdown can be reduced or prevented to a certain degree, even in the event that the above-described relation is not satisfied.

As described above, while the present second exemplary embodiment has the same advantages as with the first exemplary embodiment, with the present second exemplary embodiment, the terminal adjacent to the analog terminal is an electric power terminal which is a non-digital terminal, and accordingly these adjacent terminals can be connected with a resistance of an even lower resistance value, thereby providing further effects of reduction or prevention of electrostatic breakdown.

[Third Exemplary Embodiment]

While a third exemplary embodiment of the present invention relates to an EL display panel having the same configuration as with the first exemplary embodiment, the layout of the analog terminals and the other terminals is different.

With the present third exemplary embodiment, a part of the data lines 13 are disposed between the cathode line 10a and the anode line 11a, and between the cathode line 10b and the anode line 11b, in the plan view shown in FIG. 1. The other configuration is the same as with the first exemplary embodiment. The functions of each component are the same as with the first exemplary embodiment, so a description thereof is omitted.

Figure 6:
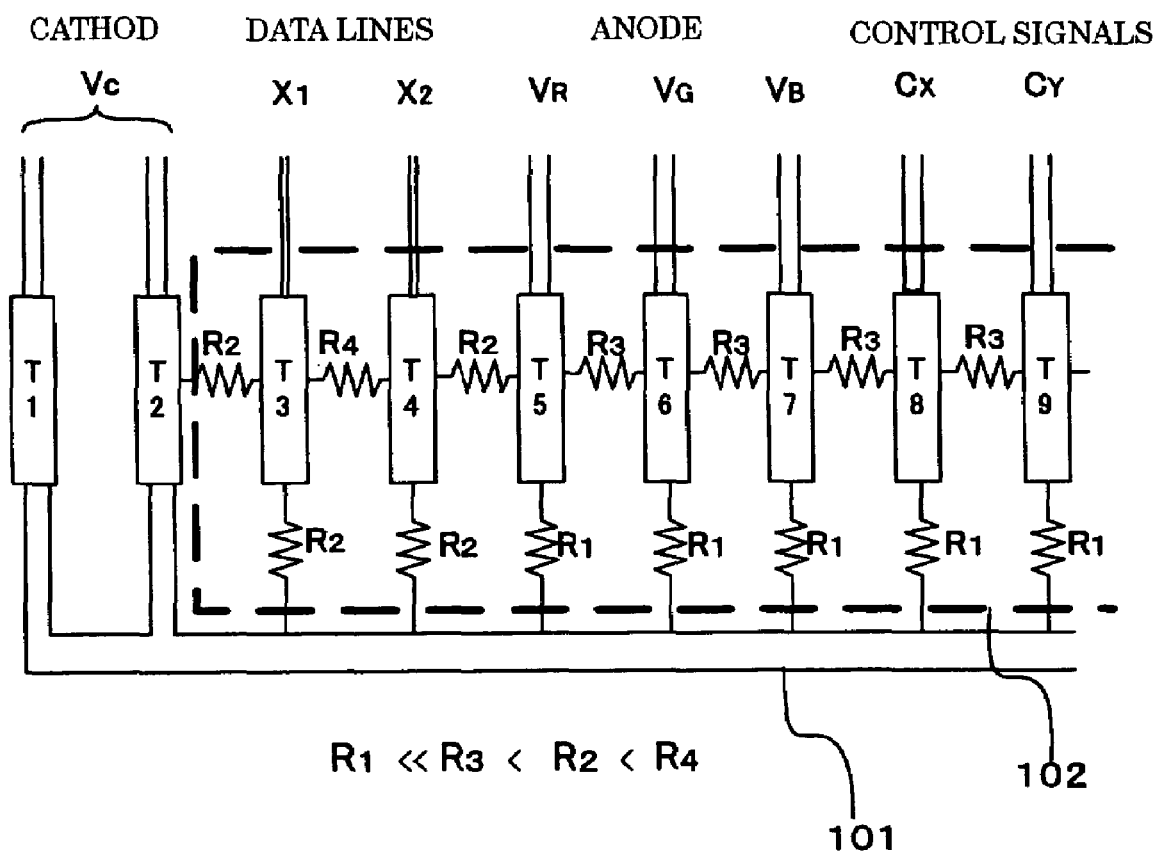
FIG. 6 is a schematic which illustrates a circuit layout on a resistance region according to a third exemplary embodiment.

FIG. 6 is a schematic which illustrates a layout of the terminals according to the present third exemplary embodiment. In particular, with the present third exemplary embodiment, the data line terminals X1 and X2 are disposed between the cathode terminal VC and the anode terminal VR. In order to further simplify description, the great number of identical terminals are not shown in FIG. 6.

As shown in FIG. 6, with the present third exemplary embodiment, the cathode terminals VC, the data line terminals X1 and X2, the anode terminals VR, VG, and VB, and the control signal terminals CX and CY, are disposed in that order from the outer perimeter to the inner side of the substrate. Of these terminals, the data line terminals serve as analog terminals to transmit analog signals, and the control signal terminals serve as digital terminals to transmit digital signals. The cathode terminals are electrically connected to the common electrode, and the anode terminals serve as electric power terminals. In a case that the electric power of the anode are actively changed, an arrangement may be made where the anode terminals serve as digital terminals for a countermeasure against electrostatic breakdown.

While the layout of the resistances is generally the same as with the first exemplary embodiment (FIG. 2), the difference therebetween is that the data line terminals X1 and X2 and the cathode terminals VC and anode terminals VR are disposed adjacent one to another, respectively. That is to say, with the present third exemplary embodiment, the non-analog terminal adjacent to the data line terminal X1 which is an analog terminal is the cathode terminal VC with low impedance, and the non-analog terminal adjacent to the data line terminal X2 which is an analog terminal is the anode terminal VR which is an electric power terminal with low impedance. No digital signals are transmitted in either of the electrode terminals, and accordingly hardly any cross-talk occurs between both electrode lines and the data line. There is no problem of cross-talk, so there are no operational problems due to reduction of the input resistance, and accordingly there is the advantage in providing a resistance with a small resistance value for reduction or prevention of electrostatic breakdown. Accordingly, with the present third exemplary embodiment, the resistance between: each of the cathode terminal and the anode terminal; and the adjacent data terminal; is set to R2.

Other resistance values for the other terminals are set in the same way as with the first exemplary embodiment, and accordingly a description thereof is omitted. That is to say, the relationship of the resistance values on the resistance region 102, $$R1 \ll R3 < R2 < R4$$

holds, in the same way as with the first exemplary embodiment. Electrostatic breakdown can be reduced or prevented to a certain degree, even in the event that the above-described relation is not satisfied.

As described above, while the present third exemplary embodiment has the same advantages as with the first exemplary embodiment, with the present third exemplary embodiment, the terminal adjacent to the analog terminal is an electric power terminal which is a non-digital terminal, and accordingly the adjacent terminal can be connected with a resistance of an even lower resistance value, thereby providing further effects of reduction or prevention of electrostatic breakdown.

In particular, the data lines to transmit analog signals, disposed adjacent to non-analog lines to transmit digital signals, tend to be easily influenced, leading to cross-talk. However, with the present exemplary embodiment, the data lines are disposed so as to be introduced between the electric power lines, and so as to be distanced from the control signal terminals to transmit digital signals, thereby efficiently maintaining reduction or prevention of electrostatic breakdown.

[Fourth Exemplary Embodiment]

A fourth exemplary embodiment of the present invention relates to an EL display panel which is an electro-optical device employing a circuit substrate described in the above exemplary embodiments.

Figure 7:
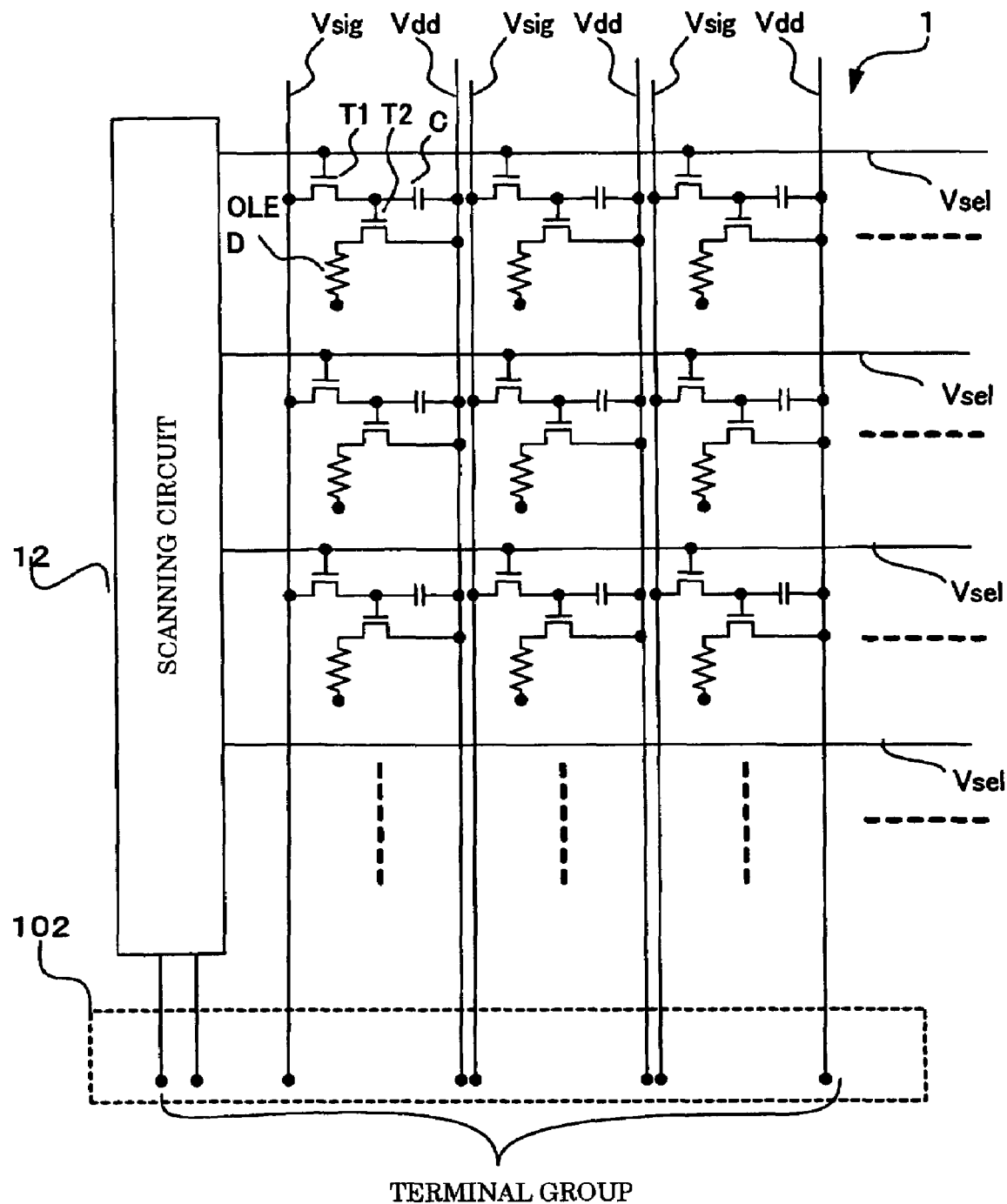
FIG. 7 is a schematic which illustrates a circuit layout of a display panel which is an electro-optical device according to a fourth exemplary embodiment.

FIG. 7 illustrates a substantive circuit diagram of the display panel 1 according to the present exemplary embodiment. The display panel of the present fourth exemplary embodiment includes a light-emission layer OLED, which can emit light for each pixel region due to the electro-luminescence effect, holding capacitance C for driving the light-emission layer OLED, and thin-film-transistors T1 and T2. The scan circuit 12 provides scan lines Vsel(14) to each of the pixel regions. Furthermore, an external D/A converter (not shown) supplies analog signals to data lines Vsig(13) through the terminals. The anode line corresponds to Vdd. The current for each pixel region is controlled by controlling the scan lines Vsel and the data lines Vsig, thereby controlling light emission from the light-emission layer OLED.

The aforementioned driving circuit is an example of circuits employing EL deices for light-emission components, and other circuit configurations may be employed. Furthermore, an arrangement may be made wherein a liquid crystal display device is employed for a light-emission component by suitably modifying the circuit configuration.

In particular, the present fourth exemplary embodiment has a configuration where the resistance region 102 is formed on the area where the terminals corresponding to the input terminals for each of signals and electric power have been formed, thereby providing electrostatic protection as described in the first exemplary embodiment through the third exemplary embodiment. That is to say, with the display panel according to the present exemplary embodiment, the inner circuits, such as pixel circuits, and the scanning circuits can be efficiently protected from electrostatic breakdown during manufacturing or at the time of use in the final product due to the functions of the substrate circuit of the present invention.

[Fifth Exemplary Embodiment]

A fifth exemplary embodiment relates to an electronic apparatus employing a display panel which comprises the electro-optical device as described in the above in exemplary embodiment 4.

The electro-optical device employing the circuit substrate according to the present invention can be applied to various types of electronic apparatuses. FIGS. 8A through 8F illustrate examples of electronic apparatuses to which the display panel 1 according to the present invention can be applied.

Figure 8A:
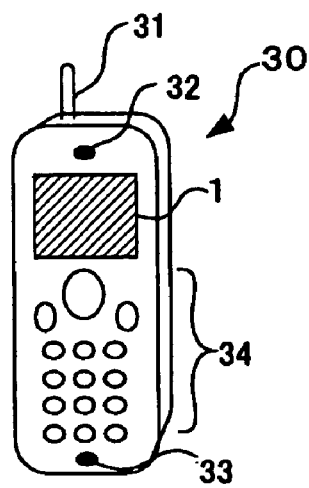
FIGS. 8A through 8F are schematics that show examples of electronic apparatuses according to a fifth exemplary embodiment showing examples in which the display panel of the present invention is applied, where

FIG. 8A shows an example wherein the present invention is applied to a cellular phone, where the cellular phone 30 includes an antenna unit 31, an audio output unit 32, an audio input unit 33, an operating unit 34, and the display panel 1 according to the present invention. As described above, the display panel according to the present invention can be applied to a display unit of a cellular phone.

Figure 8B:
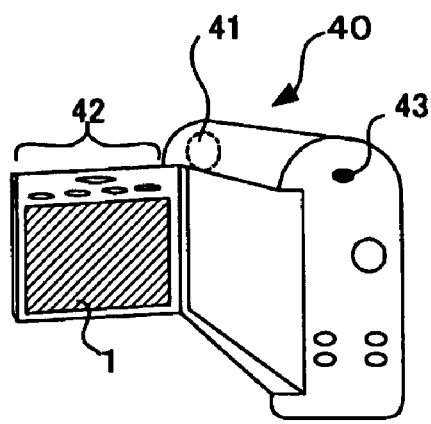

FIG. 8B shows an example wherein the present invention is applied to a video camera, where the video camera 40 includes a TV camera unit 41, an operating unit 42, an audio input unit 43, and the display panel 1 according to the present invention. As described above, the display panel according to the present invention can be applied to a viewfinder or a display unit of a video camera.

Figure 8C:
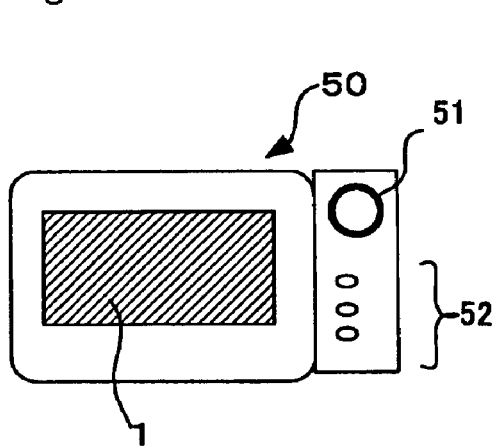

FIG. 8C shows an example wherein the present invention is applied to a portable personal computer, where the portable personal computer 50 includes a camera unit 51, an operating unit 52, and the display panel 1 according to the present invention. As described above, the display panel according to the present invention can be applied to a display unit of a computer.

Figure 8D:
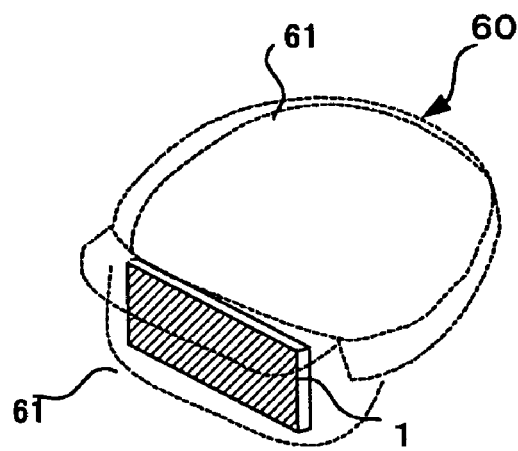

FIG. 8D shows an example where the present invention is applied to a head mount display, wherein the head mount display 60 includes a belt 61, an optical system storage unit 62, and the display panel 1 according to the present invention. As described above, the display panel according to the present invention can be applied to an image display unit of a head mount display.

Figure 8E:
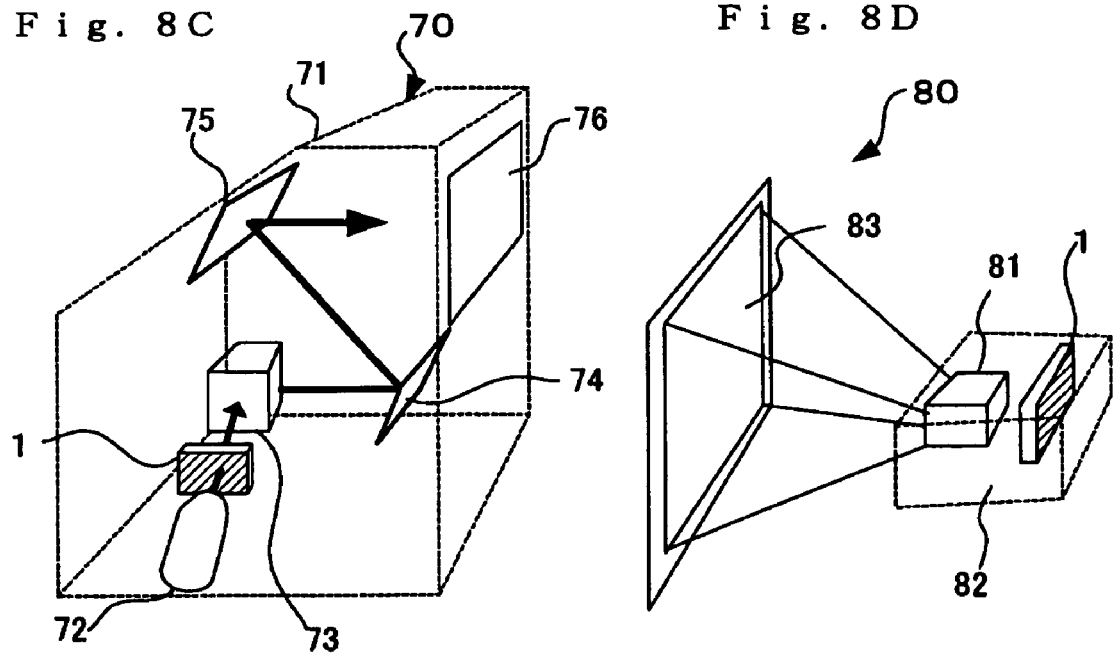

FIG. 8E shows an example wherein the present invention is applied to a rear projector, where the rear projector 70 includes casing 71, a light source 72, a synthesizing optical system 73, mirrors 74 and 75, a screen 76, and the display panel 1 according to the present invention. As described above, the display panel according to the present invention can be applied to an image display unit of a rear projector.

Figure 8F:
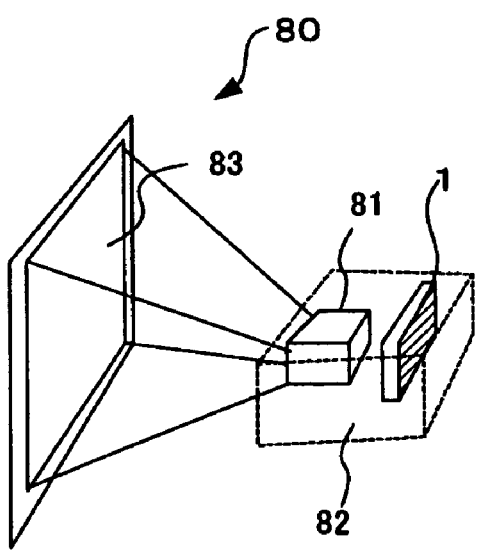

FIG. 8F shows an example where the present invention is applied to a front projector, wherein the projector 80 includes casing 82, an optical system 81, and the display panel 1 according to the present invention, where an image can be displayed on a screen 83. As described above, the display panel according to the present invention can be applied to an image display unit of a front projector.

Arrangements employing the present invention are not restricted to the above-described examples, but rather the present invention can be applied to various types of electronic apparatuses. Examples to which the present invention can be applied, other than the above-described examples, include facsimile apparatuses with display functions, digital camera viewfinders, portable TV sets, DSP devices, PDAs, palmtops, electronic signboards, and advertising displays, for example.

[Exemplary Advantages]

With the present invention, resistances connected to analog terminals have resistance values greater than those between digital terminals, thereby providing the advantage of reducing or suppressing cross-talk to a reduced amount or minimum in the analog terminals, while maintaining reduction or prevention of electrostatic breakdown due to the resistance in all terminals.

Furthermore, with an arrangement according to the present invention, where a first resistance and a second resistance are connected to the terminal in parallel, even in the event that the first resistance between the analog terminal and the adjacent terminal have a somewhat great resistance value, the total resistance value formed of the resistances connected in parallel is greatly reduced, thereby providing efficient reduction or prevention of electrostatic breakdown.

Thus, with the present invention, the internal circuit of the circuit substrate can be efficiently protected from electrostatic discharge occurring due to electrostatic charging of the substrate during manufacturing. Furthermore, even at the time of use in the final product, the internal circuit can be efficiently protected from electrostatic discharge which tends to occur at each terminal.

What is claimed is:

1. A circuit substrate, comprising:
a substrate;
a plurality of terminals formed over the substrate; and
at least one resistance;
the plurality of terminals including an analog terminal connected to an analog signal line to supply analog signals, and digital terminals connected to digital signal lines to supply digital signals; and
the one resistance having at least one end connected to the analog terminal, and having a resistance value greater than another resistance connected between the digital terminal;
the resistance and the another resistance being formed of a semiconductor film.

2. The circuit substrate according to claim 1, further comprising:
electric power terminals connected to a power source; and
resistances formed between the electric power terminals and adjacent non-electric power terminals formed for purposes other than supplying power.

3. The circuit substrate according to claim 2, the resistance having a resistance value equal to or less than the resistance connected to other non-electric power terminals.

4. The circuit substrate according to claim 1, the resistance including a protection circuit configuration employing PN junction configurations with reverse polarity.

5. An electro-optical device, comprising:
the circuit substrate according to claim 1.

6. An electronic apparatus, comprising:
the electro-optical device according to claim 5.

7. A circuit substrate, comprising:
a substrate;
a plurality of terminals formed over the substrate; and
at least one resistance;
the plurality of terminals including a first terminal connected to a data line to supply data signals, and second terminals connected to control lines to supply control signals; and
the one resistance having at least one end connected to the first terminal, and having a resistance value greater than another resistance connected between the second terminals adjacent one another the resistance and the another resistance being formed of a semiconductor film.

8. A circuit substrate, comprising:
a substrate;
a plurality of emitting elements formed in a display area, each of the plurality of emitting elements having a first electrode, a second electrode, and an emitting layer between the first electrode and the second electrode, and the first electrode being a common electrode of the plurality of emitting elements;
a common electrode line formed on the perimeter of the display area, the common electrode line connected to the common electrode;
analog signal lines to supply analog signals;
digital signal lines to supply digital signals;
an analog terminal formed over the substrate, the analog terminal being connected to one of the analog signal lines;
a digital terminal formed over the substrate, the digital terminal being connected to one of the digital signal lines;
a first resistor connected between the analog terminal and the common electrode line; and
a second resistor connected between the digital terminal and the common electrode line,
the first resistor having a resistance value greater than the second resistor.

9. A circuit substrate, comprising: a substrate; a plurality of emitting elements formed in a display area, each of the plurality of emitting elements having a first electrode, a second electrode, and an emitting layer between the first electrode and the second electrode, and the first electrode being a common electrode of the plurality of emitting elements; a common electrode line formed on the perimeter of the display area, the common electrode line connected to the common electrode; a plurality of terminals formed over the substrate, the plurality of terminals including a first terminal and a second terminal; a first resistor connected between the first terminal and the second terminal; and a second resistor connected between the common electrode line and the first terminal, the first resistor having a resistance value greater than the second resistor.

10. The circuit substrate according to claim 9,
the first resistor having a resistance value greater than the second resistor.

11. The circuit substrate according to claim 10, the plurality of terminals including an analog terminal connected to an analog signal line to supply analog signals, and digital terminals connected to digital signal lines to supply digital signals; and
both the first resistor and the second resistor which have at least one end connected to the analog terminal, having resistance values greater than both the first resistor which is connected between the digital terminals, and the second resistor which is connected between the digital terminal and the common electrode line.

12. A circuit substrate, comprising:
a substrate;
analog signal lines to supply analog signals;
digital signal lines to supply digital signals;
an analog terminal formed over the substrate, the analog terminal being connected to one of the analog signal lines;
digital terminals formed over the substrate, each of the digital terminals being connected to one of the digital signal lines respectively;
a first resistor having at least one end connected to the analog terminal; and
a second resistor connected between the digital terminals, the first resistor and the second resistor being formed of a semiconductor film,
the first resistor having a resistance value greater than the second resistor.

13. The circuit substrate according to claim 12, the first resistor and the second resistor including a protection circuit configuration employing PN junction configurations with reverse polarity.

14. An electro-optical device, comprising:
the circuit substrate according to claim 12.

15. An electronic apparatus, comprising:
the electro-optical device according to claim 14.

16. A circuit substrate comprising:

a substrate;

a plurality of emitting elements formed in a display area, each of the plurality of emitting elements having a first electrode, a second electrode, and an emitting layer between the first electrode and the second electrode, and the first electrode being a common electrode of the plurality of emitting elements;

a common electrode line formed on the perimeter of the display area, the common electrode line connected to the common electrode;

analog signal lines to supply analog signals;

digital signal lines to supply digital signals;

analog terminals formed on the substrate, each of the analog terminals being connected to one of the analog signal lines respectively;

digital terminals formed on the substrate, each of the digital terminals being connected to one of the digital signal lines respectively;

a first resistor connected between the common electrode line and one of the analog terminals;

a second resistor connected between the analog terminals;

a third resistor connected between the digital terminals; and a fourth resistor connected between the common electrode line and one of the digital terminals, the first resistor having a resistance value greater than both of the third resistor and the fourth resistor, and the second resistor having a resistance value greater than both of the third resistor and the fourth resistor.

* * * * *